United States Patent [19]
Sekine et al.

[11] Patent Number: 6,157,152
[45] Date of Patent: Dec. 5, 2000

[54] MOTOR DRIVE SYSTEM AND POWER WINDOW SYSTEM

[75] Inventors: Takeshi Sekine; Tokihiko Sugiura; Yoichi Sakuma, all of Kyoto, Japan

[73] Assignee: Omron Corporation, Kyoto, Japan

[21] Appl. No.: 09/232,024

[22] Filed: Jan. 14, 1999

[30] Foreign Application Priority Data

Jan. 14, 1998 [JP] Japan .................................. 10-006134

[51] Int. Cl.$^7$ .............................. B60J 1/08; E05F 15/00; B60R 16/02; H02P 1/22
[52] U.S. Cl. .......................... 318/266; 318/282; 318/257; 318/286; 318/466; 318/469
[58] Field of Search .................................. 318/280–296, 318/430–466, 603; 361/21, 30, 31, 32; 49/139, 349, 28

[56] References Cited

U.S. PATENT DOCUMENTS

| | | | |
|---|---|---|---|
| 4,234,834 | 11/1980 | Jennings ................................... | 318/285 |
| 4,329,594 | 5/1982 | Bohm .................................... | 307/10 R |
| 4,394,605 | 7/1983 | Terazawa ................................ | 318/280 |
| 4,628,232 | 12/1986 | Saganovsky et al. ................... | 318/284 |
| 4,709,196 | 11/1987 | Mizuta ..................................... | 318/282 |
| 5,406,183 | 4/1995 | Tomovic .................................. | 318/696 |
| 5,568,025 | 10/1996 | Sumida et al. .......................... | 318/287 |
| 5,723,960 | 3/1998 | Harada .................................... | 318/469 |
| 5,754,017 | 5/1998 | Tsuge et al. ............................. | 318/286 |
| 5,966,071 | 10/1999 | Tsuge et al. ............................. | 340/438 |

FOREIGN PATENT DOCUMENTS

| | | |
|---|---|---|
| 0 869 040 | 10/1998 | European Pat. Off. . |
| 1193344 | 5/1970 | United Kingdom . |
| 2 246 035 | 1/1992 | United Kingdom . |

*Primary Examiner*—Paul Ip
*Attorney, Agent, or Firm*—Foley & Lardner

[57] ABSTRACT

A highly dependable motor drive system capable of driving a motor with certainty even in a submersion accident and preventing overcurrent from flowing to the motor on the occasion of switching the direction of rotation. It is so arranged that, of a first and second relay for rotating the motor in the normal and reverse directions, respectively, in response to operation of associated switches, the first relay is selectively actuated and the second relay is de-energized. As the associated switch is operated, the energization of the coil of the second relay is maintained for a while by the function of a bypass circuit so that the actuation of the second relay is stopped only after actuation of the first relay with a transient motor stand-still time therebetween.

13 Claims, 9 Drawing Sheets

MOTOR DRIVE SYSTEM AND POWER WINDOW SYSTEM

FIELD OF THE INVENTION

The present invention relates to a power window system for vehicles and more particularly to a motor drive for driving the motor of said system. The invention provides a highly dependable device which is capable of driving the motor without fail even when, for example, the car or the like has fallen into the sea and become submerged and by which the flow of an overcurrent to the motor in changing the direction of its rotation can be prevented.

BACKGROUND OF THE INVENTION

Generally in the opening-closure system such as the power window of a car, the use of electronic control for implementing an automatic reversal of the action of the window and multiplex communication control constitutes a main current of technology today and as a motor drive system for supplying a current to the motor, a prime mover, as needed and controlling its operation, a motor drive system utilizing relays is generally employed. The typical construction of a conventional motor drive system of this type is as illustrated in FIGS. 7 and 9.

This conventional system is now described.

As shown in FIG. 9, this motor drive system comprises relays 2, 3 for supplying a driving current to a motor 1 to drive it in a normal direction (e.g. the direction of opening the car window) and a reverse direction (e.g. the direction of closing the car window), respectively, and switches 4, 5 for designating either the normal or the reverse rotation of the motor 1.

Here, the relays 2, 3 comprise exciting coils 2a, 3a (shown in FIG. 7) and contacts 2b, 3b each having a common terminal (C-terminal), a normally open terminal (N.O terminal), and a normally closed terminal (N.C terminal). In the non-energized state where the coils 2a, 3a are not supplied with a current, the C terminal and N.C terminal are interconnected. On the other hand, the C terminal and N.O terminal are interconnected in the energized state where the coils 2a, 3a are supplied with a current.

The N.O terminals of those relays 2, 3 are connected to a power line E1, while the N.C terminals are grounded. The C terminal of the relay 2 is connected to a terminal 1a, one of the two terminals of the winding of motor 1, which is on the side corresponding to the normal rotation of the motor upon connection to the power supply. The C terminal of the relay 3 is connected to a terminal 1b, of said two terminals of the winding of motor 1, which is on the side corresponding to the reverse rotation of the motor on connection to the power supply.

The switches 4, 5 respectively have one contact which is actuated on manipulation by the car driver, for instance, and it is so arranged that when a rotatable common operating means is rotated in one direction, for instance, the switch 4 is turned ON and when said operating means is rotated in the other direction, the switch 5 is turned ON.

Referring to the system illustrated in FIG. 7, the contacts of those switches 4, 5 are disposed in the lines grounding the respective coils 2a, 3a of relays 2, 3 so that the lines are directly opened and closed. There also is the system, as typically illustrated in FIG. 8, in which the contacts of switches 4, 5 are disposed in the lines connecting the respective coils 2a, 3a of relays 2, 3 to the power source so that those lines are opened and closed.

Furthermore, the drive system illustrated in FIG. 7 (or FIG. 8) is provided with transistors 11, 12 (or 11a, 12a) which turn ON/OFF the ground side and power source side, respectively, of the coils 2a, 3a of relays 2, 3 and a processor means 13 (or 13a) which outputs a driving signal for turning one of said transistors ON so as to drive the motor in a given direction according to an external signal or the prevailing circumstances. The processor means 13 (or 13a) may for example be a one-chip microcomputer and, in this case, one terminal each of switches 4, 5 is connected to the input terminal of said processor means so that the opening-closure state (ON-OFF) of switches 4, 5 can be read by said processor means.

In the above motor drive system, one side each of the coils 2a, 3a of relays 2, 3 are directly opened or closed by the contacts of switches 4, 5 to control the action of the motor 1.

Thus, as the switch 4 is operated to close its contact, a current flows to the exciting coil 2a of relay 2 owing to the voltage of the power line E2 to selectively actuate the contact 2b only, with the result that only the terminal 1a of the motor 1 is connected to the power source E1 through the C terminal and N.O terminal of contact 2b so that the motor is driven in the normal direction.

On the other hand, as the switch 5 is operated and its contact is closed, a current flows to the exciting coil 3a of the relay 3 due to the voltage of the power line E2 to selectively actuate the contact 3b so that only the terminal 1b of the motor 1 is connected to the power source E1 through the C terminal and N.O terminal of the contact 3b, with the result that the motor is driven in the reverse direction.

Furthermore, in the above motor drive system, the control (communication control) function for driving the motor 1 is executed, even in the absence of operation of the switches 4, 5, by the processing function of said processor means 13 (or 13a) according to a motor driving signal inputted externally by, for example, wireless communication. Moreover, the current value of motor 1 during reverse rotation (the rotation in the direction of closing the window) is read by the processor means 13 (or 13a) and if this current value is found to indicate a jam in the window, the processing function of the processor means 13 (or 13a) causes the motor 1 to rotate in the normal direction even in the absence of operation of the switch 4 to thereby operate the window in the opening direction (automatic reversal function).

Thus, when the motor 1 must be driven in the normal direction for executing the above-mentioned communication control or automatic reversal, the processor means 13 (or 13a) outputs only a driving signal for turning the transistor 11 (or 11a) ON. As the transistor 11 (or 11a) is turned ON, a current flows to the coil 2a of relay 2 to actuate the contact 2b regardless of the status of switch 4 so that the motor 1 turns in the normal direction as can be seen from FIGS. 7 and 8.

When it is necessary to rotate the motor 1 in the reverse direction for executing said communication control or the like, the processor means 13 (or 13a) outputs only a driving signal to turn the transistor 12 (or 12a) ON. As the transistor 12 (or 12a) is turned ON, a current flows to the coil 3a of relay 3 to actuate the contact 3b regardless of the status of switch 5 to rotate the motor 1 in the reverse direction.

In the conventional motor drive system described above, when, for example, the car has fallen into the sea or lake and become submerged in water, the phenomenon of a current flowing to the contacts of switches 4, 5 (the so-called leakage) may occur out of occasion depending on the properties of water even if the operating means is not manipulated and, as a consequence, even if the switches 4, 5 are operated, the motor 1 would not turn whether in the normal direction or in the reverse direction.

Thus, when the electrolyte concentration of the water is fairly high, the contacts of switches 4, 5 are interconnected by the electrolytes so that a leak current flows to the coils 2a, 3a and, therefore, depending on the magnitude of the leak current the First, the system shown in FIG. 5 is basically similar to the drive system described above with reference to FIG. 7 but is characterized in that it includes a switch 21 the contact of which opens and closes in association with the switch 4.

In the illustrated embodiment, the switch 21 comprises a C terminal connected to the power supply terminal of the coil 3a, an N.C terminal connected to the power supply line E2, and an N.O terminal connected to the ground terminal of the coil 3a through a short-circuit line 22. This switch 21 is so constructed that when an operating means is manipulated in one direction for directing the rotation of the motor 1 in the normal direction, its N.O terminal is closed in association with the closing action of the operating switch 4.

Therefore, when the operating means is manipulated in one direction for directing rotation of the motor 1 in the normal direction, the switch 21 is driven in association with the switch 4 in such a manner that the C-terminal and N.O terminal of the switch 21 and the line 22 cause a short-circuit between the power supply terminal and the ground terminal of the coil 3a of the relay 3 for driving the motor 1 in the reverse direction so that those terminals are always brought to the same contacts 2b, 3b of relays 2, 3 are both actuated. As a consequence, the terminals 1a, 1b of the motor 1 are both connected to the power supply side. Once this occurs, even if the switches 4, 5 are operated or the processor means 13 (or 13a) outputs a signal for driving whichever of the transistors, the circuit status shown in FIG. 9 is not altered so that the motor 1 is made inoperable.

It might be contemplated to overcome the above disadvantage by adopting a water-proof structure for the contacts of switches 4, 5 but this is not easily possible from technical points of view. For, since the switches 4, 5 must be such that their contacts be actuated by a mechanical action of a pressing element which has to be exposed within the car interior, it is difficult to mold the contacts and the construction will have to be too complicated in order that the necessary water proofing effect may be achieved.

OBJECT AND SUMMARY OF THE INVENTION

The object of the present invention is to provide a highly reliable motor drive system which is capable of driving the motor without fail even in a submersion accident and free from the overcurrent problem associated with change-over of the rotational direction and a power window system embodying said motor drive system.

The motor drive system according to the invention comprises a first relay and a second relay, said first relay supplying a current for driving a motor in a normal direction and said second relay supplying a current for driving the motor in a reverse direction wherein operating an associated switch circuit actuates one of said first and second relays with the actuation of the other relay being discontinued.

The motor drive system may further be characterized in that when said associated switch circuit is operated, said one relay is actuated and, after the motor has ceased to rotate, the actuation of said other relay is discontinued.

Alternatively, the motor drive system may be characterized in that when said associated switch circuit is operated, said one relay is actuated and, after a preset delay time, the actuation of said other relay is discontinued.

The motor drive system may further comprise a delay circuit for delaying discontinuation of the actuation of said other relay.

A power window system comprising the motor drive system of the present invention may also comprise an actuating circuit for operating the associated switch circuit of said motor drive system, wherein said associated switch circuit is operated upon manipulation of said actuating circuit to drive the motor and control the opening and closing of a window in accordance with the rotation of said motor.

The power window system may also be used to control the opening and closing of a sun roof in accordance with the rotation of said motor.

DETAILED DESCRIPTION OF THE PREFERRED EMBODIMENTS OF THE INVENTION

The the present applicant proposed a motor drive system using an associated switch means such that whenever one relay 2 is driven the actuation of the other relay 3 is discontinued, whereby the above problem associated with a submersion accident can be solved. A specific embodiment of the above motor drive system is now described with reference to FIG. 5 or FIG. 6. voltage level.

Figure 6:
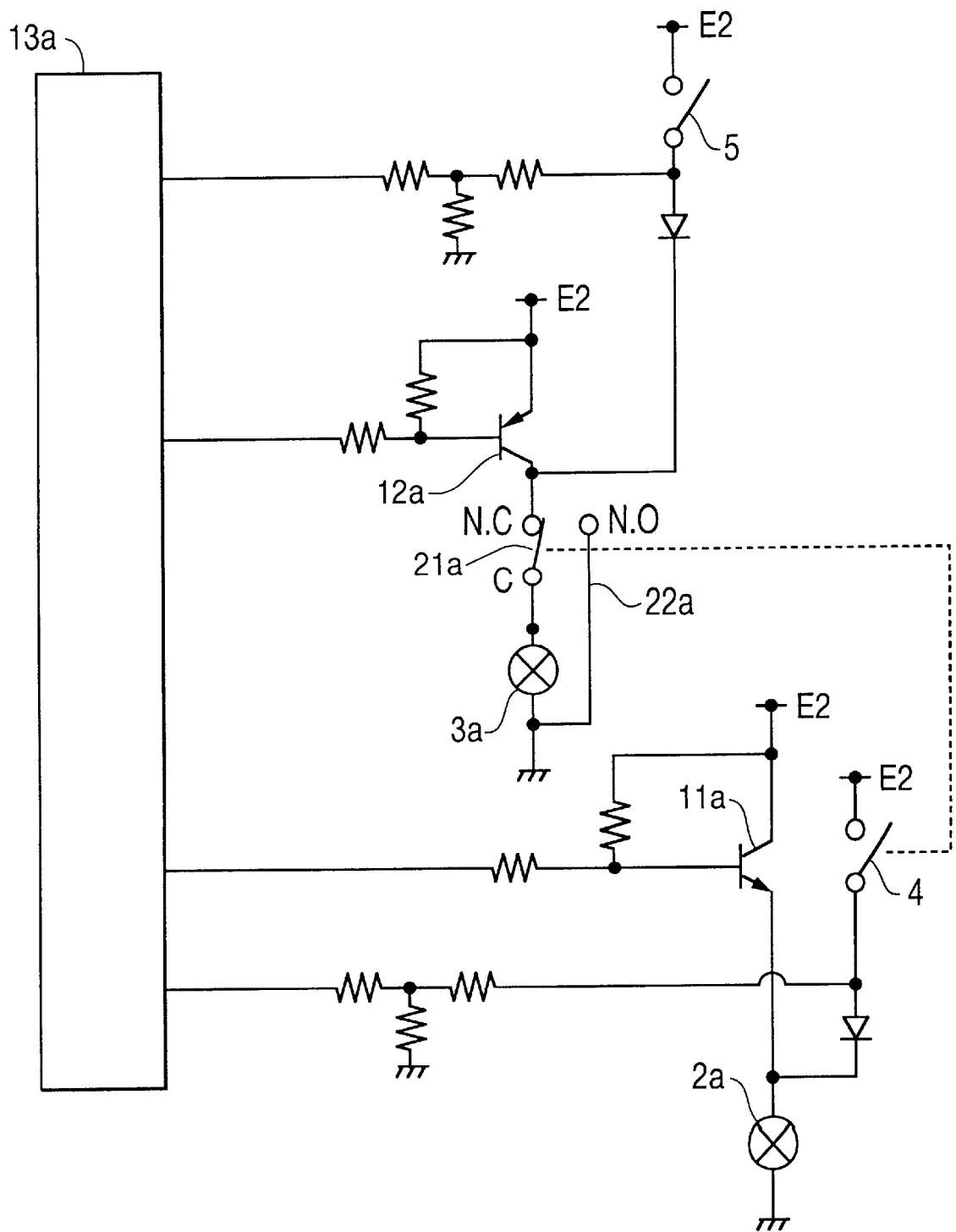
FIG. 6 is a circuit diagram showing another example of the principal construction of the motor drive system which is designed to provide for operation in a submersion accident.
Figure 7:
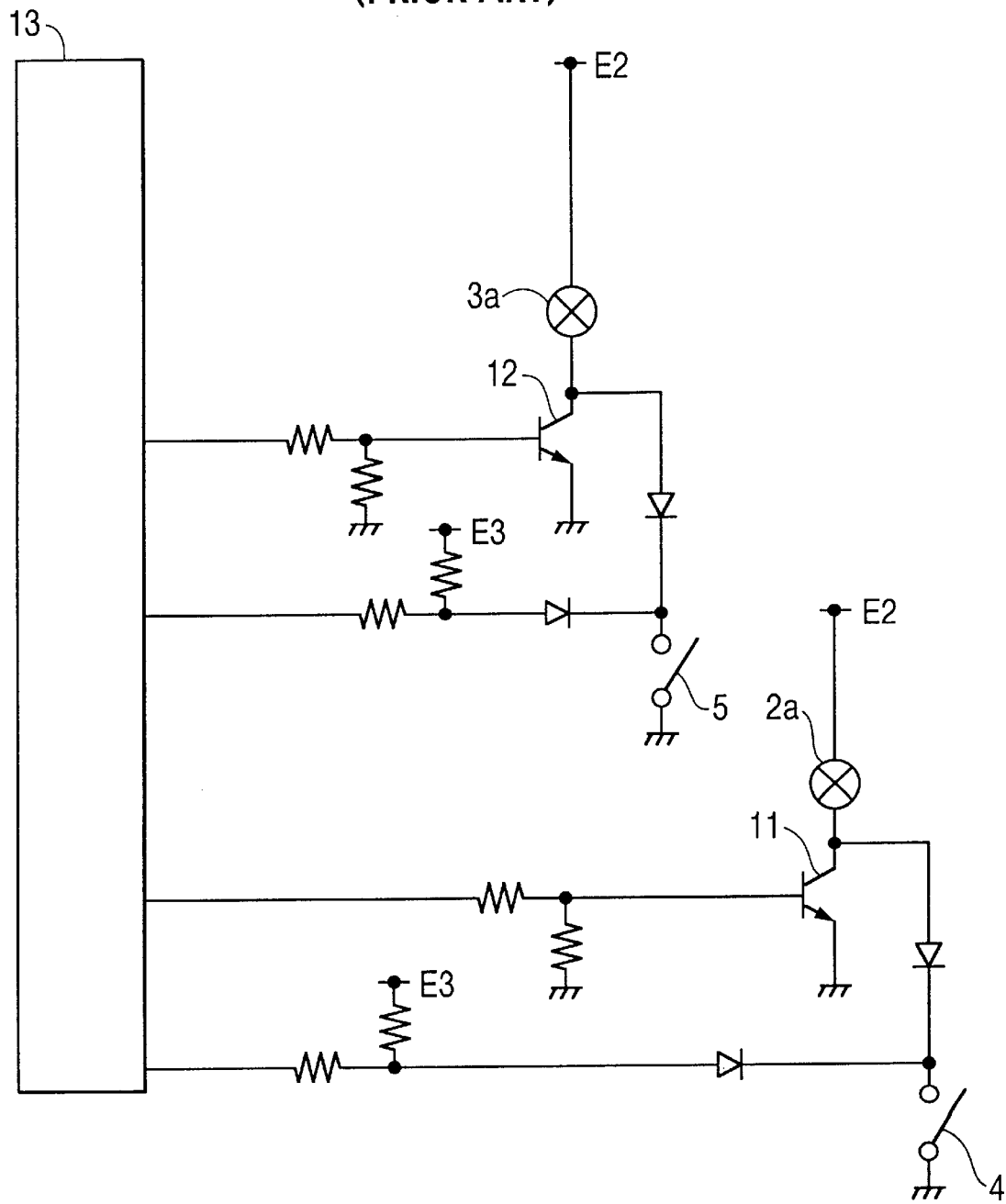
FIG. 7 is a circuit diagram showing an example of the principal construction of the conventional motor drive system.
Figure 8:
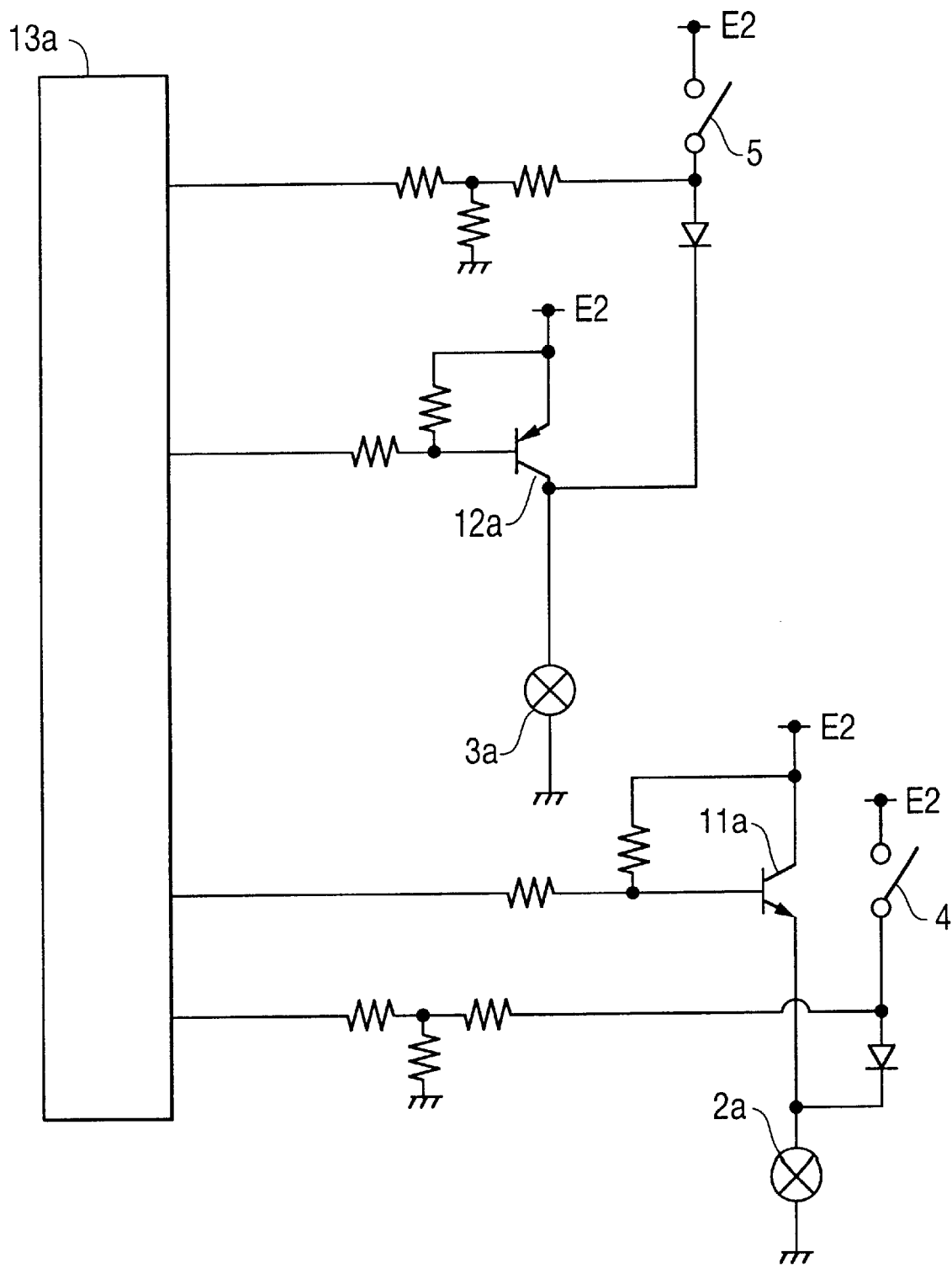
FIG. 8 is a circuit diagram showing another example of the principal construction of the conventional motor drive system.

The system illustrated in FIG. 6 is basically similar to the drive system shown in FIG. 8 but is also characterized in that it is provided with a switch 21a the contact of which opens and closes in association with the switch 4.

Here, the switch 21a comprises a C-terminal connected to the power supply terminal of the coil 3a, an N.C terminal connected to the power line E2 through the contact of a switch 5 or a transistor 12a, and an N.O terminal connected to the ground terminal of the coil 3a through a short-circuit line 22a.

This switch 21a is also constructed in such a manner that when the actuating means is manipulated in one direction for directing rotation of the motor 1 in the normal direction, it is driven in association with the closing action of the switch 4 to close its N.O terminal, with the result that a short-circuit takes place between the power supply terminal and ground terminal of the coil 3a of relay 3, bringing those terminals to the same voltage level.

In the motor drive system thus constructed, when the actuating means is manipulated in the direction corresponding to the normal rotational of the motor 1 (in this case, the direction of opening the car window) the above-described short-circuit function of the switch 21 (or 21a) and line 22 (or 22a) prevents actuation of the relay 3 for driving the motor 1 in the reverse direction (in this case, the direction of closing the car windows) with certainty.

Therefore, even if leaks occur in a submersion accident, manipulating the actuating means in the specified direction certainly results in the selective actuation of the relay 2 to cause the motor 1 to turn in the normal direction and when the system is applied to a car window, for instance, the window can be opened with certainty, thus enabling escape from the car with ease.

Figure 5:
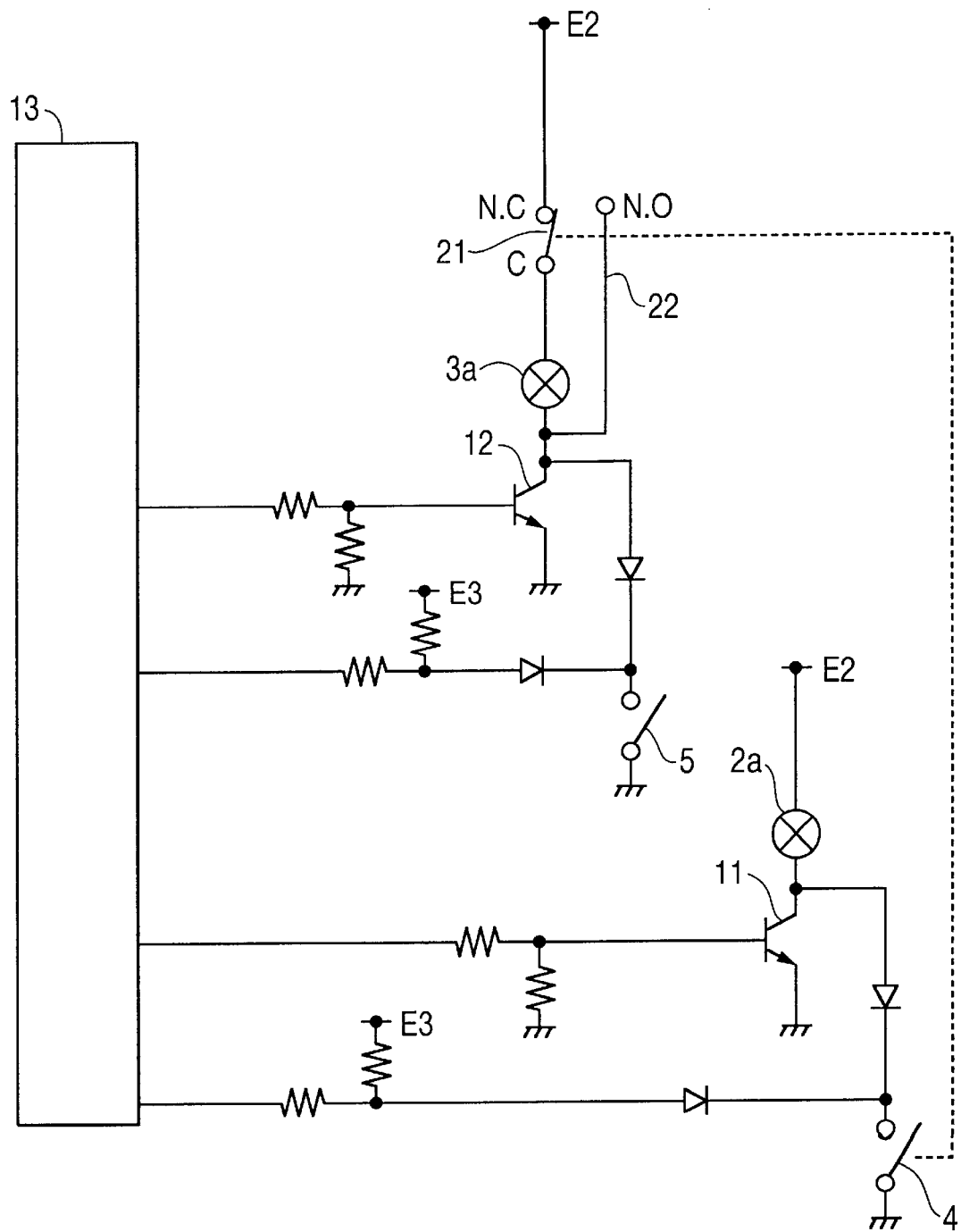
FIG. 5 is a circuit diagram showing an example of the principal construction of the motor drive system which is designed to provide for a submersion accident.

However, the system shown in FIGS. 5 and 6 has the drawback to be overcome that an overcurrent flows in the switching-over of the rotational direction.

Thus, when the switch 4 is operated during a reverse rotation of the motor (while the relay 3 is ON) and the switch 21 (or 21a) is turned in association, the actuation of the relay 3 for reverse rotation is discontinued simultaneously with the actuation of the relay 2 for normal rotation so that the rotational direction of the motor 1 is changed in an instant with the result that an overcurrent flows to the motor 1 and contacts of the respective relays. This overcurrent may interfere with the normal functioning of the motor 1 and relays and detracts seriously from the serviceable life of the relays and other members.

Several embodiments of the invention are now described with reference to the drawings.

First Embodiment

Figure 1:
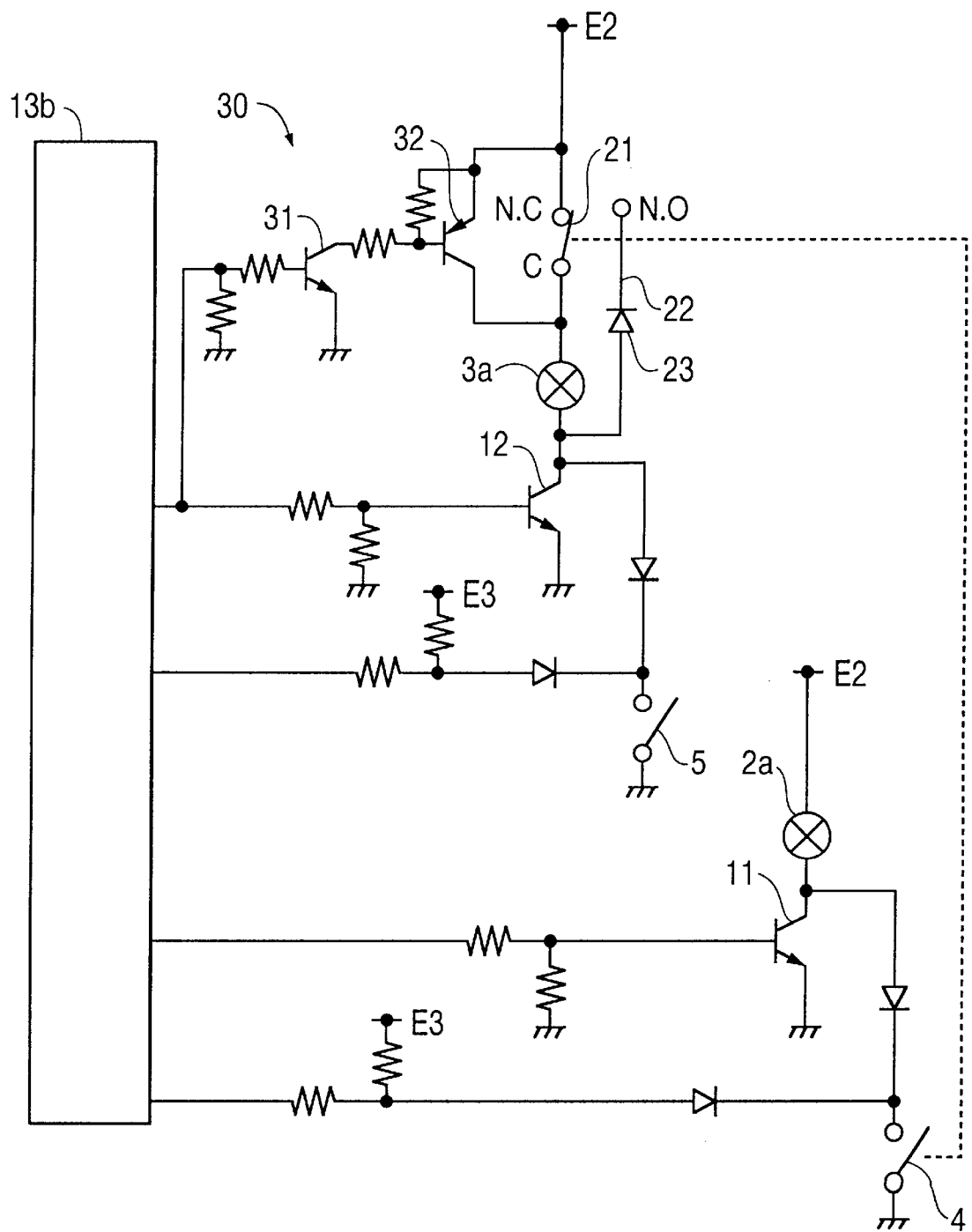
FIG. 1 is a circuit diagram showing the principal construction of the motor drive system according to the first embodiment of the invention.

An embodiment of the present invention is now described with reference to FIG. 1. FIG. 1 shows a main circuit configuration for the motor drive system according to this embodiment. Here, the exterior construction of the system and the structures of switch actuating elements are not shown.

Figure 9:
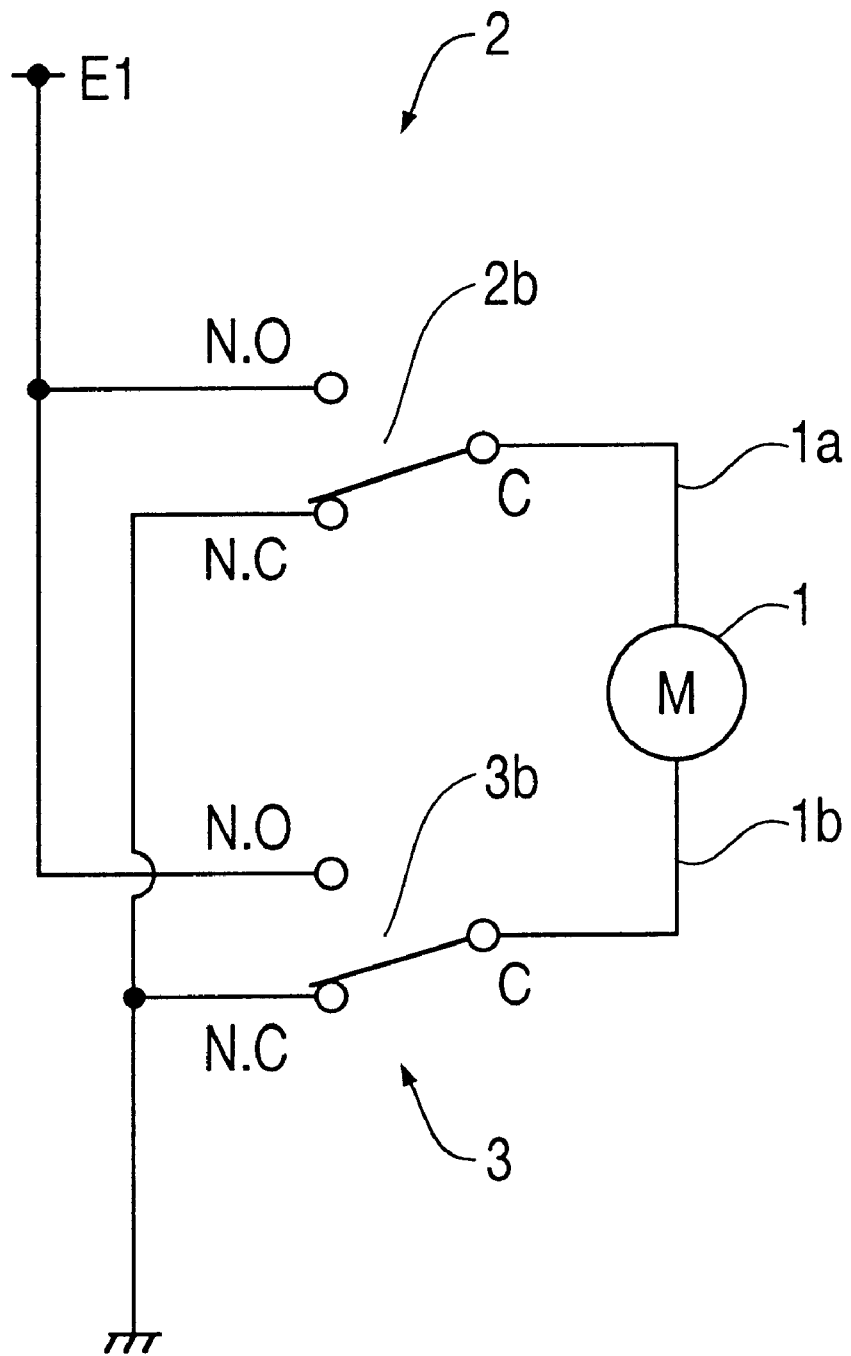
FIG. 9 is a circuit diagram showing the construction of the relay contact of the motor drive system.

The system according to this embodiment is basically similar to the system described hereinbefore with reference to FIGS. 5 and 9. Therefore, the like parts are indicated by the like numerals and the explanations which would be overlapping are omitted.

The motor drive system according to this embodiment is equipped with a bypass circuit 30 (delay circuit) which invalidates the action of a switch 21 associated with a switch 4 in parallel with said switch 21 and, as such, is characterized in that this bypass circuit 30 is driven by an output signal from a processor means 13b. The short-circuit line 22 is provided with a diode 23 for arresting the flow of a current from the power supply side to the ground side.

The bypass circuit 30 is provided with two transistors 31, 32 and has the function to connect the coil 3a of the relay 3 to the power source E2 by the switching action of those transistors according to a driving signal output from the processor means 13b. Thus, as the base voltage of the NPN transistor 31 is turned ON by a driving signal from the processor means 13b, the base voltage of the PNP transistor 32 is turned OFF by the switching action of the transistor 31, whereupon the transistor 32 is actuated to connect the coil 3a of the relay 3 to the power source E2.

In this case, the driving signal from the processor means 13b for driving the transistor 31 of the bypass circuit 30 is similar to the driving signal for driving the transistor 12 and, as shown in FIG. 1, is outputted from the same output line.

The processor means 13b in this embodiment drives the motor in the normal direction or in the reverse direction regardless of operation of the switch 4 or switch 5 for executing said communication control or automatic reversal function so that in addition to the ordinary control function to output the driving signal for driving the transistor 11 or transistor 12 (and transistor 31), it has a control function to output a driving signal for driving the transistor 12 (and transistor 31) for a preset delay time when the switch 4 is operated for a change in rotational direction during the operation of the relay 3 (during the reverse rotation of the motor 1).

Thus, the processor means 13b is so programmed that if, while only the switch 5 remains ON (during a reverse rotation of motor 1), it detects turning-OFF of switch 5 and simultaneous turning-ON of switch 4, it outputs a driving signal for driving the transistor 12 and transistor 31 for a predetermined delay time.

Moreover, the processor means 13b is so programmed that if, while a driving signal for driving the transistor 12 and transistor 31 for rotating the motor 1 in the reverse direction is being outputted (during a reverse rotation of the motor 1) in response to an external signal or the like, it detects turning-ON of switch 4, it outputs a driving signal for driving the transistor 12 and transistor 31 continuously for a preset delay time and, then, stops outputting.

In the above motor drive system according to this embodiment, if the switch 4 is turned ON by manipulation of the actuating means in the normal rotational direction of motor 1 (in this case, the direction of opening the car window or the like), the short-circuit function of the switch 21 and short-circuit line 22 insures that the two terminals of the coil 3a of the relay 3 for driving the motor 1 in the reverse direction (in this case, the direction closing the car window) are certainly short-circuited and brought to substantially the same voltage level.

Therefore, if leaks occur in a submersion accident, manipulating the actuating means in the designated direction certainly results in the selective actuation of the relay 2 only so that the motor 1 is rotated in the normal direction. When this system is applied to a car window or a sun roof, the window or sun roof can be opened with certainty.

Since the short-circuit line 22 in this embodiment is provided with a diode 23, the two terminals of the coil 3a are not necessarily brought to strictly the same voltage level even when the switch 21 is operated but since the leak current is weak, the accidental operation of the relay 3 by the leak current is avoided.

Moreover, when the switch 4 is operated during actuation of the relay 3 (during a reverse rotation of the motor 1) to change the direction of rotational direction, the energization of the coil 3a (actuation of the relay 3) is continued for a time corresponding to said delay time owing to the operation of said bypass circuit 30 and transistor 12 based on the above-mentioned control function of the processor means 13b.

Thus, the switch 21 is operated in association with the action of the switch 4 so that even though the connection between the coil 3a and the power source E2 by the switch 21 is interrupted, the connection between the coil 3a and power supply E2 is allowed to continue for the above-mentioned time corresponding to the delay time through the transistor 32 in the bypass circuit 30 and, at the same time, the connection between the coil 3a and the ground is also established by the transistor 12 for said delay time. If the diode 23 is absent, the current flows to the ground bypassing the coil 3a through the C terminal and N.O terminal of the switch 21 and the short-circuit line 22. However, the diode 23 prevents this routing of the current so that the coil 3a remains energized.

In this manner, even when the above-mentioned switch-over operation is carried out, the supply of a current to the coil 3a (actuation of relay 3) continues for said delay time. In other words, the interruption of the action of relay 3 is delayed for a predetermined time corresponding to said delay time and the discontinuation of actuation of the relay 3 takes place only after the energization of the coil 2a (actuation of relay 2) by operation of the switch 4.

Therefore, immediately following the above-mentioned change-over manipulation, the relay 3 is still operating together with relay 2 during the above delay time and in the contact circuit shown in FIG. 9 both terminals of the motor 1 remain connected to the power supply side so that the motor 1 stands still transiently during this delay time. In this manner, the drawback of an overcurrent flowing momentarily upon change of the rotational direction of the motor 1 is avoided.

Figure 4:
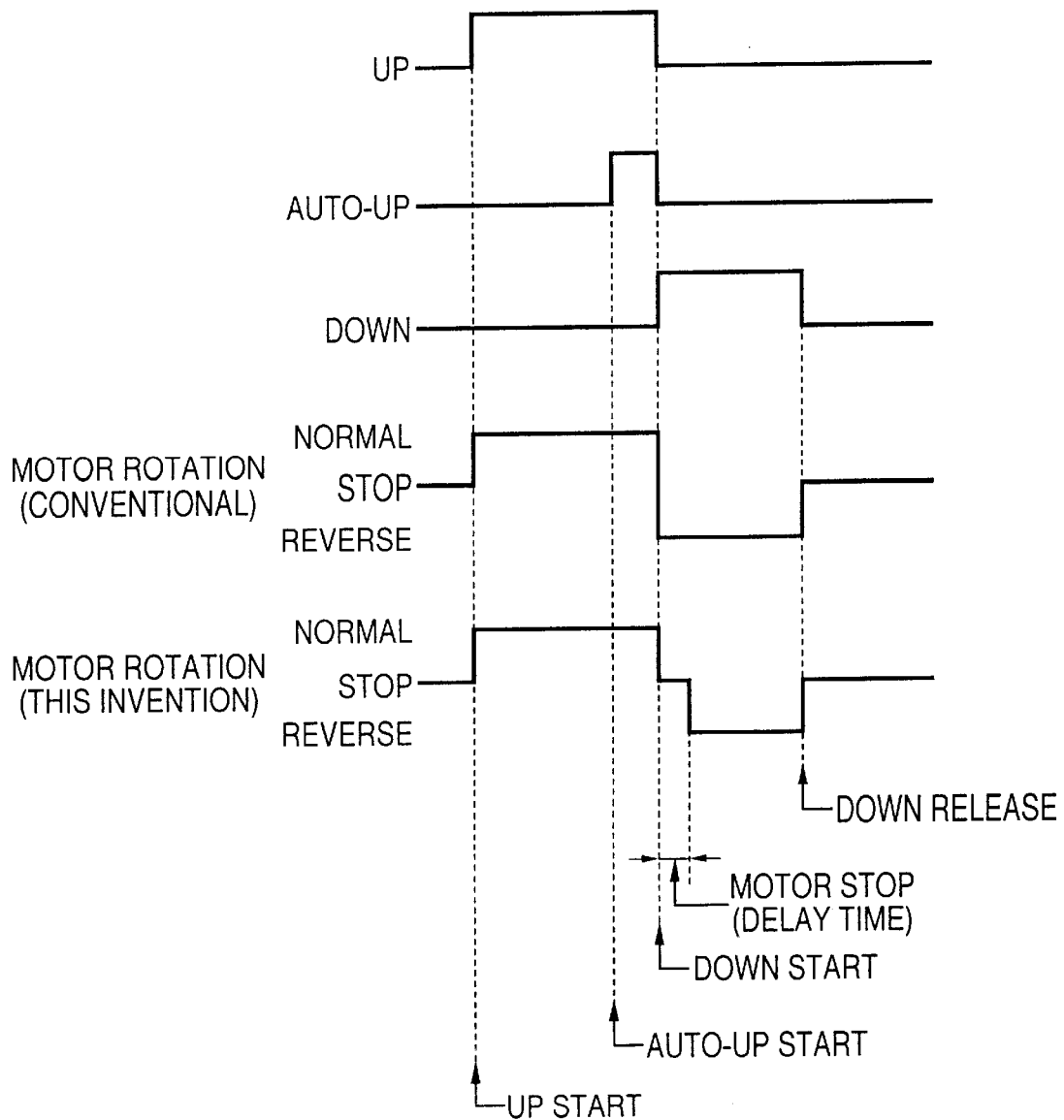
FIG. 4 is a timing chart for explaining the operation of the invention.

For example, when a down operation is performed during the auto-up process as shown in FIG. 4, the rotational direction of the motor 1 is instantly changed as shown in the stage 4 of FIG. 4 so that an overcurrent flows in the conventional system but in the system according to this embodiment, a phase of transient stop of the motor 1 is provided as shown in the stage 5 (bottom stage) of FIG. 4 so that no abrupt change in the direction of rotation takes place, thus avoiding the overcurrent problem.

The "up" manipulation in FIG. 4 is the manipulation of the actuating means for driving the motor 1 in the reverse direction to close the window or the like and, in the illustrated embodiment, the switch 5 is turned ON by this manipulation. The "down" manipulation means the manipulation of the actuating means for driving the motor 1 in the normal direction to open the window or the like and, in this embodiment, the switch 4 is turned ON by this manipulation. The "auto up" is the operation for automatic continuation of the "up" process up to complete closure of the window or the like due to, for example, a mechanical hold function of the actuating means.

Therefore, in accordance with the motor drive system of the invention, the motor can be exactly rotated in the normal direction by manipulation of the actuating means even in a submersion accident and, in this case, the reliability of the system in the direction of the normal rotation of the motor (the direction of opening the window or the like) is improved.

When this motor drive system is applied to the motor for operating the power window of a motor vehicle or the motor for operating the sun roof of a car, a positive opening of the power window or sun roof is insured for increased chances for escape and, hence, increased safety.

Furthermore, since in this embodiment the drawback of an overcurrent flowing to the motor can be obviated, the dependability of the system in this aspect is also enhanced so that not only the safety in the event of a submersion accident is insured but also an extended serviceable life of the system can be materialized. For the prevention of said overcurrent, it might be contemplated to provide a motor stop mode by a mechanical contrivance built into the switch operating system but since the stop time in that case depends on the operation speed of the switching system, it would be difficult to accurately provide a sufficient stop time. In this respect, with the arrangement of this embodiment, a sufficient stop time can be easily and accurately provided to overcome the overcurrent problem. Moreover, in terms of circuit configuration, the system is very simple only calling for addition of the bypass circuit 30 so that the whole system can be implemented at very low cost.

Second Embodiment

The second embodiment of the invention is now described with reference to FIG. 2.

Since the motor drive system according to this embodiment is basically identical to the system described above with reference to FIGS. 6 and 9, the like numerals are used to indicate the like parts and those explanations which would overlap are omitted.

The motor drive system according to this embodiment is characterized by provision of a bypass circuit (delay circuit) 40 for invalidating the action of the switch 21a operatively associated with the switch 4 in parallel with said switch 21a, which bypass circuit 40 is driven as necessary by an output signal from the processor means 13c. In addition, the short-circuit line 22a is provided with a diode 23a for arresting the flow of a current from the power source side to the ground side.

Here, the bypass circuit 40 is equipped with one transistor 41 and has a function such that the switching of this transistor 41 according to a driving signal output from the processor means 13c causes the coil 3a of relay 3 to be connected to the power source E2 side bypassing the switch 21a. Thus, when the base voltage of this NPN transistor 41 is turned OFF by a driving signal from the processor means 13c, the transistor 41 is actuated to connect the coil 3a of relay 3 to the N.C terminal of the switch 21a.

The processor means 13c in this embodiment, too, has not only the regular control function to output a driving signal for actuating the transistor 11a or transistor 12a for the execution of said communication control or automatic reversal but also a control function such that when the switch 4 is operated for a change of direction during the operation of relay 3 (the reverse rotation of motor 1), it outputs a driving signal for actuating the transistor 12a and transistor 41 for a time corresponding to a preset delay time.

In the thus-constructed motor drive system according to this embodiment, too, just as in the first embodiment, when the actuating means is manipulated in the direction of causing a normal rotation of the motor 1 and, hence, the switch 4 is turned ON, the two terminals of the coil 3a of the relay 3 for driving the motor 1 in the reverse direction are always short-circuited and brought to substantially the same voltage level by the functioning of the shorting circuit consisting of the switch 21a and short-circuit line 22a.

Therefore, even if leaks occur in a submersion accident, manipulating the actuating means in a specified direction results in selective actuation of the relay 2 only to let the motor 1 rotate in the normal direction, so that when the system is applied to the car window or sun roof, the window or sun roof can be opened without fail.

Furthermore, when the switch 4 is operated for a change in direction during the operation of the relay 3 (during the reverse rotation of the motor 1), operation of the bypass circuit 40 and transistor 12a based on said control function of processor means 13c causes the energization of coil 3a (operation of relay 3) to be continued for a time corresponding to said delay time. Therefore, when said switching of the direction of rotation is made, the motor 1 ceases to rotate during said delay time so that the trouble of an overcurrent flowing to the motor 1 upon momentary change in the direction of rotation can be avoided.

Therefore, with the motor drive system according to this embodiment, too, just as it is true with the first embodiment, a sufficient countermeasure against a submersion accident is insured and, at the same time, the trouble of an overcurrent flowing to the motor is avoided. Therefore, in this respect, the system dependability is enhanced and a long serviceable life of the system can be implemented.

The present invention is not restricted to the above embodiments but may take various other forms and modifications.

For example, while in the above embodiments a shorting circuit is provided only for the coil 3a of the relay 3 for driving the motor 1 in the reverse direction to improve the operational reliability of the system particularly in the direction of normal rotation of the motor 1 (the direction of opening the window or the like) a similar shorting circuit may be provided for the coil 2a of the relay 2 for driving the motor 1 in the normal direction to improve the operational reliability of the system in the direction of reverse rotation of the motor 1 (the direction of closing the window or the like). In this case, too, said overcurrent can be precluded by disposing a bypass circuit similar to that described hereinbefore in parallel with the switch for this shorting circuit to delay the stop of the relay 2.

Figure 3:
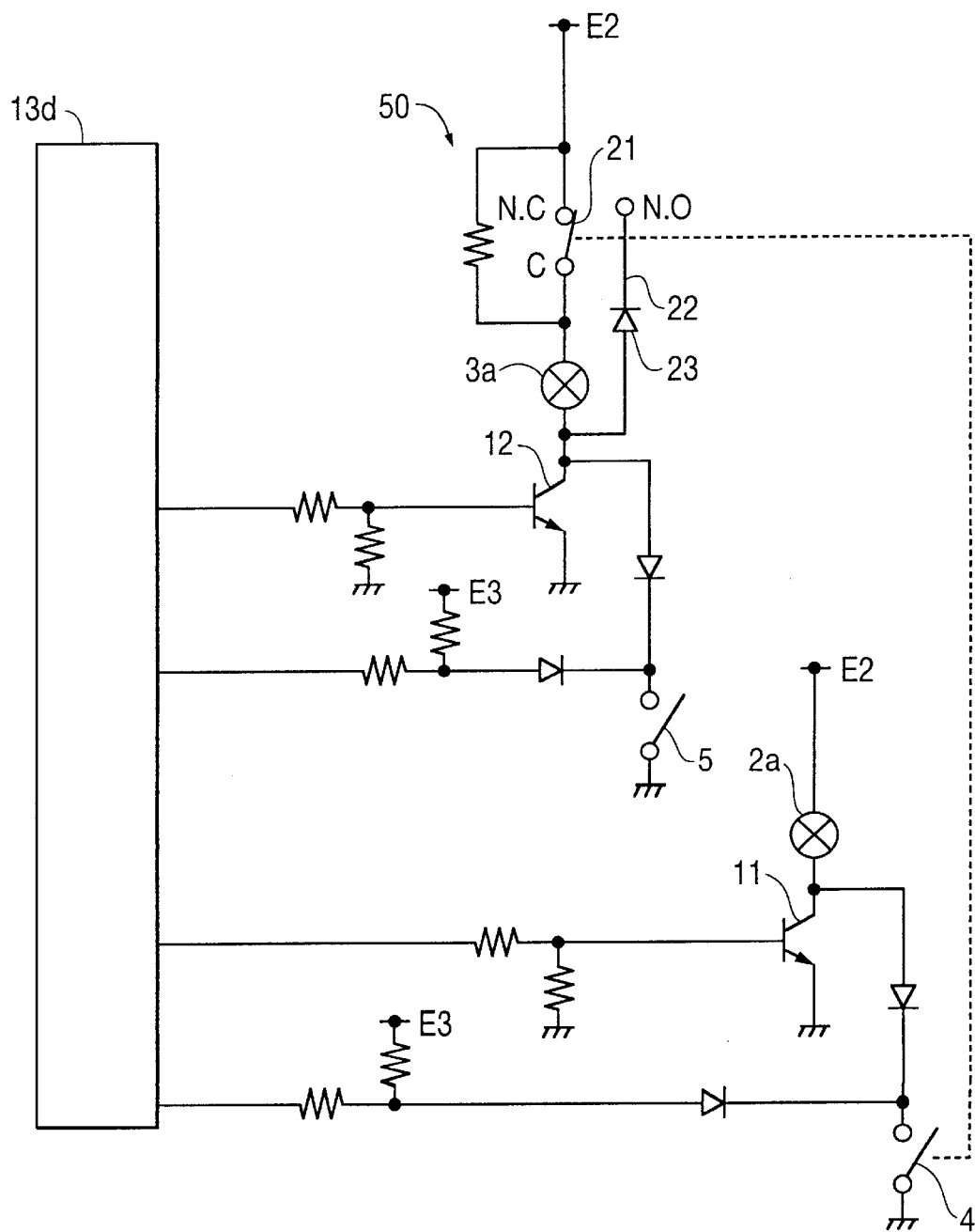
FIG. 3 is a circuit diagram showing the principal construction of the motor drive system according to a further embodiment of the invention.

Moreover, the bypass circuit for delaying the stop action of the other relay on the occasion of said manipulation for a change in direction may for example be a resistance disposed in parallel with the switch 21 which is an associated switch as in the bypass circuit 50 shown in FIG. 3. In this case, too, as the transistor 12 is turned ON under the control of processor means 13d for a time corresponding to a present delay time, the energization of coil 3a is continued to provide a transient stand-still or stop time for the motor 1.

Furthermore, while in the above embodiments the stop action of the other relay is delayed for a time corresponding to a preset delay time, it is possible to provide a sensor for detecting the stop of rotation of the motor 1 and delay the stop of the relay under the control of said processor means until the complete termination of rotation of the motor has been detected by said sensor.

The construction for delaying the stopping of the other relay in accordance with the invention is not restricted to the above construction including a bypass circuit which is controlled by processor means but may be any arrangement by which the energization of the coil of the other relay may be transiently maintained when the associated switch is actuated.

Figure 2:
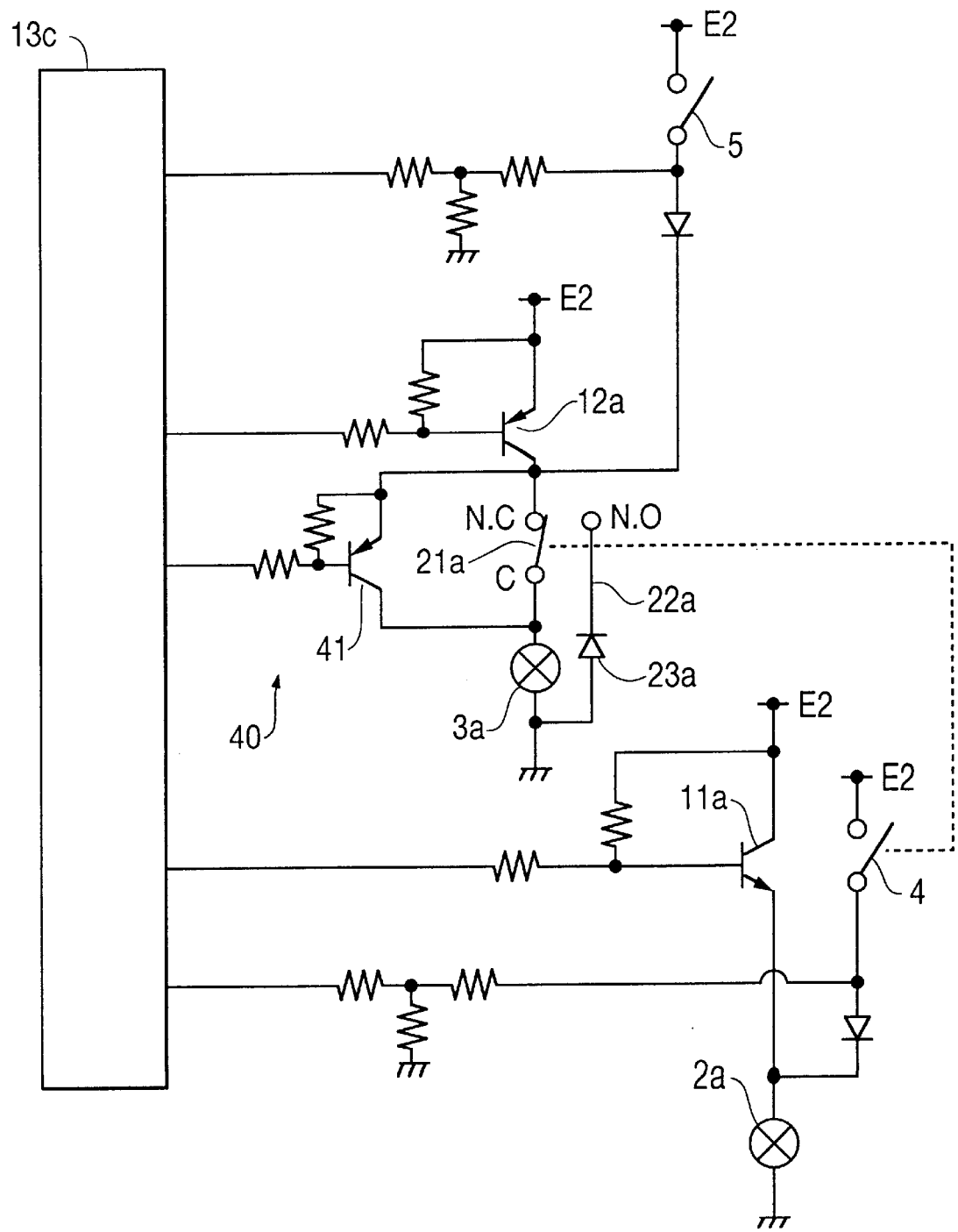
FIG. 2 is a circuit diagram showing the principal construction of the motor drive system according to the second embodiment of the invention.

However, since the bypass circuit shown in FIGS. 1–3 can be readily added, the necessary function can be implemented at very low cost.

EFFECT OF THE INVENTION

In the motor drive system of the first embodiment of the invention, an associated switch means can be operated to actuate one of the two relays for driving a motor in the normal and reverse directions, respectively, and at the same time, stop the action of the other relay.

Therefore, even when leaks occur in a submersion accident, the trouble of simultaneous operation of the two relays causing the motor to become inoperable can be avoided so that the rotation of the motor in a given direction by one of the relays can be realized with certainty and high reliability.

Furthermore, in another aspect of this drive system, when said associated switch means is operated, one of the relays is actuated and, then, the other relay is stopped by the function of the delay circuit. Therefore, there is provided a period during which both relays are operating transiently immediately after operation of the associated switch, with the result that an overcurrent flowing to the motor upon instantaneous change of the rotational direction of the motor is avoided and, hence the overcurrent problem is overcome.

Particularly in the case of the motor drive system of yet another aspect of the invention, operating the associated switch means results in actuation of one of the relays to stop the rotation of the motor and, then, the energization of the other relay is stopped. Therefore, a sufficient period for complete stopping of the motor is provided so that the above-mentioned overcurrent trouble can be more completely avoided.

Furthermore, in still another aspect of the motor drive system, operating the associated switch means results in energization of one of the relays and only after a preset delay time, energization of the other relay is discontinued. Therefore, when a sufficiently long time is set for said delay time, there can be provided a sufficient time for complete stopping of the motor so that the above-mentioned overcurrent trouble can be more completely avoided.

And when the motor drive system of the invention is applied to the power window system for a car window or sun roof, the positive opening and closing of the window or the like can be insured even in a submersion accident and, at the same time, the overcurrent trouble on switching-over of the direction of rotation can be avoided. In this respect, too, the reliability of the system is improved and a long serviceable life of the system is realized.

What is claimed is:

1. A motor drive system comprising:
   a first relay, said first relay supplying a current for driving a motor in a normal direction;
   a second relay, said second relay supplying a current for driving the motor in a reverse direction; and
   an associated switch circuit, wherein said associated switch circuit actuates one of said first and second relays with actuation of the other of said first and second relays being discontinued by short circuit.

2. The motor drive system defined in claim 1, wherein when said associated switch circuit is operated, said one relay is actuated and, after the motor has ceased to rotate, the actuation of said other relay is discontinued.

3. The motor drive system defined in claim 1 wherein when said associated switch circuit is operated, said one relay is actuated and, after a preset delay time, the actuation of said other relay is discontinued.

4. The motor drive system defined in claim 1 further comprising a delay circuit for delaying discontinuation of the actuation of said other relay.

5. The motor drive system as defined in claim 1, wherein each of said first and second relays comprise an exciting coil, a common terminal, a normally open terminal and a normally closed terminal.

6. A motor drive system for opening and closing a vehicle window comprising:

a first relay, said first relay supplying a current for driving a motor in a normal direction;

a second relay, said second relay supplying a current for driving the motor in a reverse direction;

an associated switch circuit, wherein said associated switch circuit actuates one of said first and second relays with actuation of the other of said first and second relays being discontinued by short circuit; and an actuating circuit for operating the associated switch circuit of said motor drive system, wherein said associated switch circuit is operated upon manipulation of said actuating circuit to drive the motor and control the opening and closing of the window.

7. The motor drive system as defined in claim 6 wherein when said associated switch circuit is operated, said one relay is actuated and, after the motor has ceased to rotate, the actuation of said other relay is discontinued.

8. The motor drive system as defined in claim 6 wherein when said associated switch circuit is operated, said one relay is actuated and, after a preset delay time, the actuation of said other relay is discontinued.

9. The motor drive system as defined in claim 6 wherein the motor drive system further comprises a delay circuit for delaying discontinuation of the actuation of said other relay.

10. A motor drive system for opening and closing a sun roof comprising:

a first relay, said first relay supplying a current for driving a motor in a normal direction;

a second relay, said second relay supplying a current for driving the motor in a reverse direction;

an associated switch circuit, wherein said associated switch circuit actuates one of said first and second relays with actuation of the other of said first and second relays being discontinued by short circuit; and an actuating circuit for operating the associated switch circuit of said motor drive system, wherein said associated switch circuit is operated upon manipulation of said actuating circuit to drive the motor and control the opening and closing of the sun roof.

11. The motor drive system as defined in claim 10 wherein when said associated switch circuit is operated, said one relay is actuated and, after the motor has ceased to rotate, the actuation of said other relay is discontinued.

12. The motor drive system as defined in claim 10 wherein when said associated switch circuit is operated, said one relay is actuated and, after a preset delay time, the actuation of said other relay is discontinued.

13. The motor drive system as defined in claim 10 wherein the motor drive system further comprises a delay circuit for delaying discontinuation of the actuation of said other relay.

* * * * *